United States Patent
Huang et al.

(10) Patent No.: US 7,298,928 B2
(45) Date of Patent: Nov. 20, 2007

(54) METHOD FOR CONVERTING IMAGE FROM LOW RESOLUTION INTO HIGH RESOLUTION

(75) Inventors: Chao-Chih Huang, Tai Ping (TW); Ching-Yeh Yu, Tai Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 97 days.

(21) Appl. No.: 10/975,461

(22) Filed: Oct. 29, 2004

(65) Prior Publication Data

US 2007/0053613 A1 Mar. 8, 2007

(30) Foreign Application Priority Data

Oct. 30, 2003 (TW) .............................. 92130173 A

(51) Int. Cl.
*G06K 9/32* (2006.01)

(52) U.S. Cl. ................ 382/299; 358/3.07; 348/333.11; 345/698; 715/800

(58) Field of Classification Search ................ 382/100, 382/293, 298, 299; 358/1.2, 3.07, 451; 348/14.12, 348/333.11; 345/3.3, 698; 715/800, 815
See application file for complete search history.

(56) References Cited

U.S. PATENT DOCUMENTS

| | | | | |
|---|---|---|---|---|
| 4,720,745 A | * | 1/1988 | DeForest et al. | 348/448 |
| 5,754,710 A | * | 5/1998 | Sekine et al. | 382/300 |
| 5,911,007 A | * | 6/1999 | Miyake | 382/233 |
| 5,940,132 A | | 8/1999 | Kondo et al. | |
| 6,157,749 A | * | 12/2000 | Miyake | 382/300 |
| 6,178,272 B1 | * | 1/2001 | Segman | 382/298 |
| 6,222,944 B1 | | 4/2001 | Li et al. | |
| 6,281,875 B1 | * | 8/2001 | Zhao et al. | 345/611 |
| 6,360,029 B1 | * | 3/2002 | Moller | 382/298 |
| 6,590,938 B1 | | 7/2003 | Azadegan et al. | |
| 6,812,935 B1 | * | 11/2004 | Joe et al. | 345/660 |

OTHER PUBLICATIONS

Bruni et al., "A novel adaptive vector quantization method for memory reduction in MPEG-2 HDTV decoders", IEEE Transactions on Consumer Electronics, vol. 44, No. 3 (1998), pp. 537-544.
Tajime et al., "Memory compression method considering memory bandwidth for HDTV decoder LSIs", IEEE Transactions on Consumer Electronics (1999), pp. 779-782.

* cited by examiner

*Primary Examiner*—Vikkram Bali
*Assistant Examiner*—Anand Bhatnagar
(74) *Attorney, Agent, or Firm*—Birch, Stewart, Kolasch & Birch, LLP

(57) ABSTRACT

A method of scaling up an image. The method converts a source image with M*N pixels into a target image with KM*HN pixels and includes the steps of: choosing a pixel from the source image as a processing pixel; analyzing the character of the processing pixel according to values of a plurality of pixels neighboring the processing pixel, and choosing a tilt pattern as a characteristic pattern; calculating a pixel compensation matrix according to the characteristic pattern, the pixel value of the processing pixel, and the values of the pixels neighboring the processing pixel; calculating K*H target pixel values as the target image according to the pixel value of the processing pixel and its corresponding pixel compensation matrix; and repeating the above-mentioned steps until all the pixels of the source image are processed.

14 Claims, 3 Drawing Sheets

METHOD FOR CONVERTING IMAGE FROM LOW RESOLUTION INTO HIGH RESOLUTION

This application claims the benefit of the filing date of Taiwan Application Ser. No. 092130173, filed on Oct. 30, 2003, the content of which is incorporated herein by reference.

BACKGROUND OF THE INVENTION

1. Field of the Invention

The invention relates to an image processing method, and more particularly to a method for scaling up an image.

2. Description of the Related Art

The video technology has been widely used in various electrical products. Generally speaking, when the compression/decompression modules utilize the standard video encoder/decoder, such as JPEG, MPEG, MPEG-2, MPEG-4, H.263, H.264, and the like, to process the image frame, the modules have to store the image data in the memory temporarily or permanently for the processing necessity.

However, in the system having ultra-large frame and ultra-high frame rates, the frame consumes a lot memory space and the system bus bandwidth, and thus tends to increase the system loading. For example, in a HDTV (High-Definition Television), each frame needs the memory space for 1920*1088*1.5=3.13 Mbytes, wherein 1920*1088 is the frame resolution.

Because the resolution of the frame of HDTV can reach 1920×1088, two problems should be considered. The first problem is that the memory required by the system is too large. The second problem is that the bandwidth consumed by the data transmission of the system is too large. In order to reduce the consumption of the bandwidth and the memory space without changing the architecture of the conventional decoder, the frame data should be compressed before the data is written in the memory or inputted to the bus, and returned to the original condition after the data is read or before the data is inputted to the micro-controller. Hence, the memory space and the transmission bandwidth can be reduced by using the compression unit and decompression unit.

FIG. 1 is a diagram showing that four points are compressed into one point. Some simple compression methods in the pixel domain will be described in the following.

1. Average of four points: four points in a 2×2 block of FIG. 1 are averaged into a point as the compression value of four points. That is, $$y(m, n) = \frac{1}{4}\sum_{k=0}^{1}\sum_{h=0}^{1} x(i+h, j+k).$$

2. Take the point at the upper-left corner: the upper-left point of the block is directly taken as the compression value of the four points. That is, $y(m,n)=x(i,j)$.

If the compression value is going to be returned to the original shape, one of the following methods may be applied.

1. Duplicate into four points: the four points in the block use duplicated average.

2. Bilinear interpolation: take a linear interpolation of two adjacent points to obtain the value of the point between the two adjacent points.

It is known in the art that the frame compression and decompression methods greatly influence the frame quality. The designer needs to choose a proper method so as to prevent the frame quality from deterioration.

SUMMARY OF THE INVENTION

It is therefore an object of the invention to provide a method for scaling up an image without consuming a lot of memory space.

An object of the invention is to provide a method for scaling up an image without consuming a lot of transmission bandwidth.

An object of the invention is to provide a method for scaling up an image without greatly deteriorating image quality.

To achieve the above-mentioned object, the invention provides a method for scaling up an image. The method scales up a source image (low-resolution image) with the resolution of M*N to a target image (high-resolution image region) with the resolution of KM*HN. The method includes the steps of: choosing a pixel from a source image as a processing pixel; analyzing the characteristic of the processing pixel according to the values of a plurality of neighboring pixels close to the processing pixel and choosing a tilt pattern as a characteristic pattern; generating a pixel compensation matrix according to the characteristic pattern, the value of the processing pixel, and the values of the neighboring pixels; generating K*H target pixels as the target image according to the value of the processing pixel and the pixel compensation matrix; and repeating the above-mentioned steps until all of the pixels of the source image are processed.

DETAILED DESCRIPTION OF THE INVENTION

Figure 1:
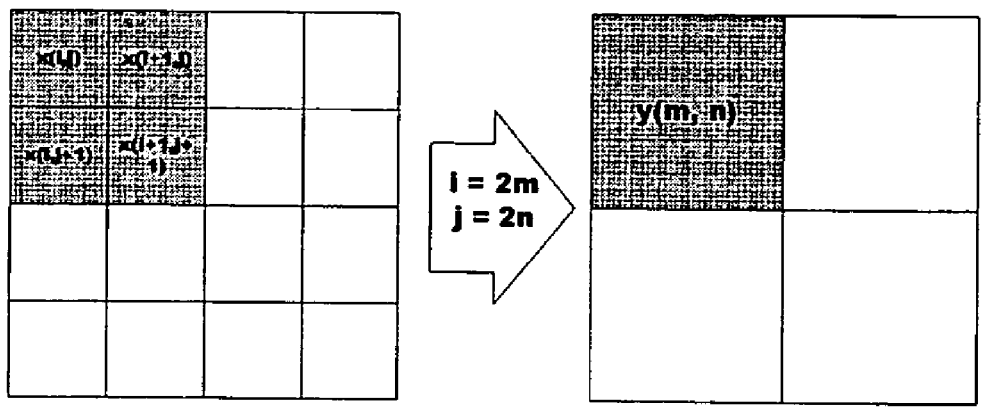
FIG. 1 is a diagram showing that a high-resolution image with 2×2 points is compressed into one point.
Figure 2:
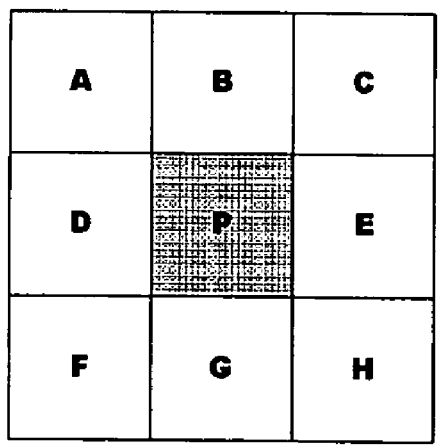
FIG. 2 is a diagram showing that an original pixel point P is scaled up to 2×2 points.
Figure 2:
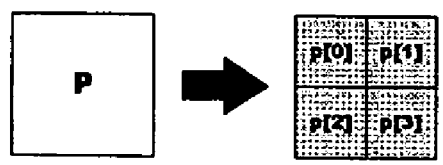

FIG. 2 is a diagram showing that an original pixel point P is scaled up to 2×2 target pixel points P[1], P[2], P[3], and P[0] according to a embodiment of the invention. The original pixel point P is defined as a processing pixel and chosen from a source image region. On the source image region, the processing pixel P has eight neighboring pixel points, which are the points (A~H) having the pixel values A to H, respectively.

Figure 3:
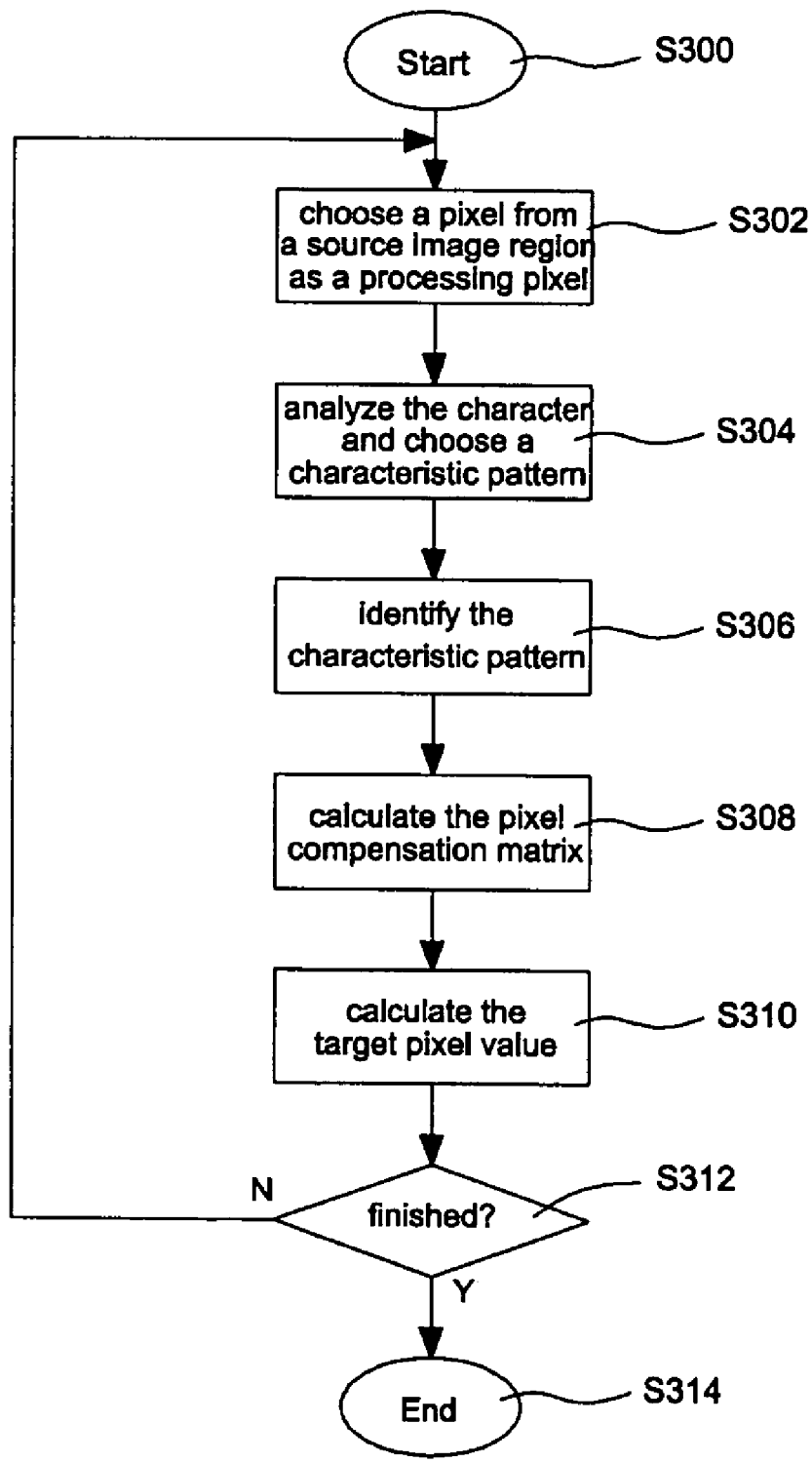
FIG. 3 shows a flow chart showing the method of the invention for scaling up an image.

FIG. 3 shows a flow chart showing an embodiment of the method of the invention for scaling up an image. The steps of the method of the present invention will be described with reference to FIG. 2, FIG. 3, and FIG. 4.

Step S302: Choose a pixel from the source image region as the processing pixel P.

Figure 4A:
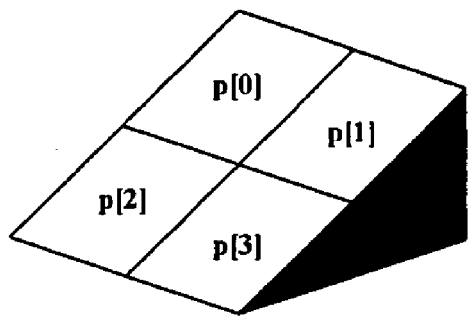
FIG. 4 shows five possible tilt patterns after the original pixel point is scaled up.
Figure 4B:
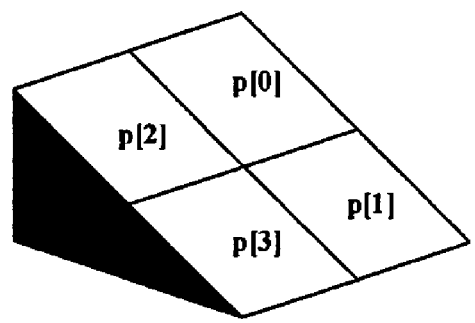
Figure 4C:
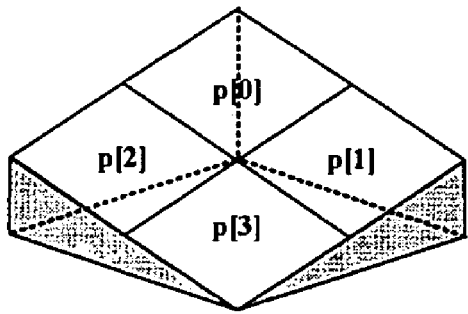
Figure 4D:
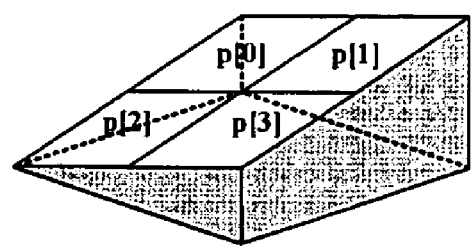
Figure 4E:
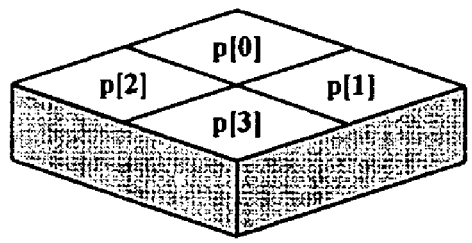

Step S304: Analyze the characteristic according to the values of the neighboring pixels close to the processing pixel P and choose a characteristic pattern. The characteristic analyzing is performed to determine the tilt direction of the values of the neighboring pixels. In general, the tilt direction is substantially divided into a vertical direction, a horizontal direction, and two diagonal directions. Hence, the tilt direction of the target pixels is obtained by the characteristic analyzing procedure. Please refer to FIG. 4, wherein FIG. 4(a) shows the vertical tilt direction, FIG. 4(b) shows the horizontal tilt direction, FIG. 4(c) shows the left-to-right diagonal tilt direction, FIG. 4(d) shows the right-to-left diagonal tilt direction, and FIG. 4(e) shows the smooth pattern.

To determine which characteristic pattern match the pixel values of the target image region being scaled up, the following weighted summation procedures may be used to calculate eight weighted pixel values ($v_A$ to $v_H$).

$$v_A = 2A + B + D$$

$$v_B = 2B + A + C$$

$$v_C = 2C + B + E$$

$$v_D = 2D + A + F$$

$$v_E = 2E + C + H$$

$$v_F = 2F + D + G$$

$$v_G = 2G + F + H$$

$$v_H = 2H + E + G$$

wherein $v_A$ to $v_H$ represent the weighted value around the processing pixel P in eight directions. For example, $v_A$ represents the value corresponding to the upper-left direction.

Next, the tilt direction is determined according to $v_A$ to $v_H$. Usually, the pixel values at two opposite sides along the tilt direction are quite different. That is, the larger the difference between the pixel values in one direction, the more likely the direction being the tilt direction. The tilt direction may be determined according to the following equations:

$$d_0 = v_D - v_E$$

$$d_1 = v_B - v_G$$

$$d_2 = v_C - v_F$$

$$d_3 = v_A - v_H$$

$$\text{dir} = \arg\max_i \{|d_i|\}$$

wherein "dir" is the direction value of the tilt direction. That is, when $d_0$ is the maximum among $d_i$, the characteristic pattern is the horizontal characteristic pattern; when $d_1$ is the maximum among $d_i$, the characteristic pattern is the vertical characteristic pattern; when $d_2$ is the maximum among $d_i$, the characteristic pattern is the positive-slope tilt characteristic pattern; and when $d_3$ is the maximum among $d_i$, the characteristic pattern is the negative-slope tilt characteristic pattern. Accordingly, a characteristic pattern may be chosen according to the direction value dir.

Step S306: Identify whether or not the characteristic pattern meets the above-mentioned assumption which indicates that the value of the processing pixel P ranges between the high point and low point in the tilt direction. This assumption must be correct so as to avoid the error tilt. In other words, it is possible check whether or not the original pixel value and its corresponding neighboring pixel values in the tilt direction satisfy the assumption. For example, if the up and down points in the tile direction are D and E, then D, E and P must satisfy the following relationship:

$$D \leq P \leq E$$

or $$D \geq P \geq E$$

If the above-mentioned relationship is not satisfied, it means that the position of the processing pixel P does not correspond to the assumption of the tilt direction. At this time, it is possible to assume that the 2×2 block including four points P[1], P[2], P[3], and P[0] is a smooth pattern, or choose a tilt direction corresponding to a second large direction value dir as the characteristic pattern and repeating the identifying procedure. The equations for identifying various direction values dir are as follows:

$$\text{dir}=0 \Rightarrow D \leq P \leq E \leq \text{or } E \leq P \leq D$$

$$\text{dir}=1 \Rightarrow B \leq P \leq G \leq \text{or } G \leq P \leq B$$

$$\text{dir}=2 \Rightarrow C \leq P \leq F \leq \text{or } F \leq P \leq C$$

$$\text{dir}=3 \Rightarrow A \leq P \leq H \leq \text{or } H \leq P \leq A$$

Step S308: Calculate the pixel compensation matrix. If the direction value dir and the processing pixel P match the above-mentioned conditions, the tilt direction assumption is satisfied and the procedure of calculating the compensation matrix of the tilt direction may be started. In this embodiment, if the compression method represents that four points are compressed into one point, the value of the processing pixel P and the values A to H of the neighboring pixels may be used to generate the p[0:3]. That is, $$p[i] = f_i(A, B, \ldots, H, P) + P$$

$$P' = \begin{bmatrix} p[0] & p[1] \\ p[2] & p[3] \end{bmatrix} = \begin{bmatrix} f_0(A, \ldots, H, P) & f_1(A, \ldots, H, P) \\ f_2(A, \ldots, H, P) & f_3(A, \ldots, H, P) \end{bmatrix} + P \begin{bmatrix} 1 & 1 \\ 1 & 1 \end{bmatrix}$$

wherein $f_i(A, B, \ldots, H, P)$ represents the compensation matrix. In this embodiment, the forms of $f_0$ to $f_3$ may be simplified by an exact matrix set and an exact function set. The exact matrix set and the exact function set may be determined according to the tilt direction. First, a plurality of 2 by 2 matrixes may be chosen as the exact matrix set S. In addition, several functions are chosen to be the exact function set U. Each element β in S corresponds to a function $g_i(A, \ldots, H, P)$ in the set U. $P_1$ is a multiple of one of the elements β, and multiplier is $g_i(A, \ldots, H, P)$. That is, the pixel value of the processing pixel P and the values of the corresponding neighboring pixels are substituted into the corresponding exact function set U to generate a plurality of scalar values. Thereafter, these scalar values are respectively multiplied by its corresponding exact matrix S so as to obtain the following compensation values of pixel (referred to as $P_1$).

$$S = \{\beta_0, \ldots, \beta_{N-1}\}, U = \{g_0(A, \ldots, H, P)\}$$

-continued $\exists\, i,\, dir,\, \beta_{dir} \in S,\, g_{dir} \in U$ $P' = P_1 + P_2 = g_{dir}(A, \ldots, H, P) \times \beta_{dir} + P\begin{bmatrix} 1 & 1 \\ 1 & 1 \end{bmatrix} = 1$ $g_{dir}(A, \ldots, H, P) \times \begin{bmatrix} \beta_{dir,0} & \beta_{dir,1} \\ \beta_{dir,2} & \beta_{dir,2} \end{bmatrix} + P\begin{bmatrix} 1 & 1 \\ 1 & 1 \end{bmatrix}$ For example, the set S may be chosen as:

$S\left\{ \begin{bmatrix} 1 & -1 \\ 1 & -1 \end{bmatrix}, \begin{bmatrix} 1 & 1 \\ -1 & -1 \end{bmatrix}, \begin{bmatrix} 0 & 1 \\ -1 & 0 \end{bmatrix}, \begin{bmatrix} 1 & 0 \\ 0 & -1 \end{bmatrix} \right\}.$ The corresponding function set U is:

$U = \{g_0, g_1, g_1, g_3\}$ $g_0 = \dfrac{(B+E)-(D+G)}{8}$ $g_1 = \dfrac{(B+D)-(E+G)}{8}$ $g_2 = \dfrac{(2D+A+F)-(2E+C+H)}{16}$ $g_3 = \dfrac{(2B+A+C)-(2G+F+H)}{16}$ wherein the exact matrix set S and the exact function set U are defined in advance. Thereafter, the corresponding exact matrix and exact function are chosen according to the tilt direction. That is, a proper exact matrix and function may be selected according to the actual condition so that the optimum adjustment may be made.

Step S310: Calculate the target pixel value. A plurality of target pixel values are obtained by adding the pixel value of the processing pixel and its corresponding pixel compensation matrix together. A target image may be obtained by properly placing the target pixel into the source image. The target image is the scaled up source image.

Step S312: Identify whether or not the method is finished. The above-mentioned steps are repeated until all pixels to be processed are processed.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for scaling up an image, the method converting a source image with M*N pixels into a target image with KM*HN pixels, wherein M, N, K and H are integers and the method comprises the following steps of:
choosing one pixel from the source image as a processing pixel;
performing a weighted summation procedure to generate a plurality of weighted pixel values according to the processing pixel and a plurality of neighboring pixels close to the processing pixel in the source image;
determining a characteristic pattern according to the weighted pixel values;
generating a pixel compensation matrix according to the characteristic pattern;
generating K*H target pixels according to a pixel value of the processing pixel and the pixel compensation matrix; and
repeating the above-mentioned steps until all pixels of the source image are processed.

2. The method according to claim 1, wherein the step of determining the characteristic pattern further comprises the steps of:
determining a tilt direction according to the plurality of weighted pixel values and a plurality of tilt condition equations; and
determining an exact matrix and an exact function according to the tilt direction.

3. The method according to claim 2, wherein the step of generating the pixel compensation matrix further comprises:
substituting the pixel value of the processing pixel and the values of the neighboring pixels into the exact function, so as to generate a scalar-value; and
multiplying the scalar value by the exact matrix, so as to obtain the pixel compensation matrix.

4. The method according to claim 1, wherein the step of determining the characteristic pattern further comprises:
checking whether or not the value of the processing pixel and the values of the neighboring pixels match the characteristic pattern through utilizing a plurality of conditional equations.

5. The method according to claim 1, wherein the step of generating the pixel compensation matrix thither comprises:
substituting the value of the processing pixel and the values of the neighboring pixels into an exact function, so as to generate a scalar value; and
multiplying the scalar value by an exact matrix, so as to obtain the pixel compensation matrix.

6. A method for converting a source pixel into a plurality of target pixels, comprising the following steps of:
generating plurality of weighted pixel values according to the source pixel and at least one neighboring pixel close to the source pixel;
determining an exact matrix and an exact function according to the weighted pixel values and a plurality of tilt condition equations;
determining a compensation pixel value by utilizing the exact matrix and the exact function; and
generating the plurality of target pixels according to the source pixel and the compensation pixel value.

7. The meted according to claim 6, wherein the compensation pixel value is determined according to a plurality of predetermined patterns.

8. The method according to claim 7, wherein the plurality of predetermined patterns include a vertical tilt pattern, a horizontal tilt pattern, a left-to-right tilt pattern, a right-to-left tilt pattern, and a smooth pattern.

9. The method according to claim 6, wherein the step of determining the compensation pixel value further comprises:
determining a tilt direction according to the weighted pixel values and the tilt condition equations; and
determining the compensation pixel value according to the tilt direction.

10. The method according to claim 6, wherein the step of determining the compensation pixel value further comprises:
substituting the source pixel and the neighboring pixel into the exact function to generate a scalar value; and multiplying the scalar value by the exact matrix, so as to obtain the compensation pixel value.

11. A method for scaling up an source image, comprising the following steps of:
generating a plurality of weighted pixel values according to a processing pixel selected from the source image and a plurality of neighboring pixels close to the processing pixel;
determining a tilt direction according to the weighted pixel values and a plurality of tilt condition equations;
determining a compensation pixel value according to the tilt direction; and
generating a plurality of target pixels according to the processing pixel and the compensation pixel value.

12. The method according to claim 11, wherein the tilt direction is selected from directions comprising a vertical direction, a horizontal direction, a left-to-right direction and a right-to-left direction.

13. The method according to claim 11, wherein the step of determining the compensation pixel value further comprises:
determining an exact matrix and an exact function according to the weighted pixel values and the tilt condition equations; and
substituting the value of the processing pixel and the values of the neighboring pixels into the exact matrix and the exact function, so as to determine the compensation pixel value.

14. The method according to claim 11, wherein the step of determining the compensation pixel value further comprises:
substituting the processing pixel and the neighboring pixel into an exact function to generate a scalar value; and
multiplying the scalar value by an exact matrix, so as to obtain the compensation pixel value.

* * * * *